United States Patent [19]

Zazzara

[11] 4,045,151
[45] Aug. 30, 1977

[54] DOUGH FORMING AND CUTTING MACHINE

[76] Inventor: Joseph R. Zazzara, 302 Albert Road, Syracuse, N.Y. 13214

[21] Appl. No.: 661,724

[22] Filed: Feb. 26, 1976

[51] Int. Cl.² .......................................... A21C 11/12
[52] U.S. Cl. .................................. 425/297; 425/307; 425/313; 425/364 R
[58] Field of Search ............... 425/306, 307, 308, 140, 425/313, 184, 297, 364 R, 364 B, 369, 296; 83/469, 665, 425.3

[56] References Cited

U.S. PATENT DOCUMENTS

| | | | |
|---|---|---|---|
| 381,554 | 4/1888 | Humble | 425/297 |
| 385,234 | 6/1888 | Bon | 83/425.3 |
| 809,498 | 1/1906 | Dickson | 425/307 |
| 1,167,187 | 1/1916 | Lauterbur | 425/140 |
| 2,566,628 | 9/1951 | Patt | 425/184 X |
| 2,666,398 | 1/1954 | Gendler et al. | 425/364 B |
| 2,677,334 | 5/1954 | Hansen | 425/335 X |
| 2,719,495 | 10/1955 | Heuwing | 425/364 |
| 3,143,084 | 8/1964 | Rhodes | 425/364 |
| 3,272,153 | 9/1966 | Morabito | 425/297 |

FOREIGN PATENT DOCUMENTS 265,644   6/1926   United Kingdom .................. 425/306

Primary Examiner—Ronald J. Shore
Assistant Examiner—William R. Briggs
Attorney, Agent, or Firm—Charles S. McGuire

[57] ABSTRACT

Apparatus for rolling, forming and severing a product such as comestible dough. A mass of unformed dough is placed on a conveyor belt above which a rigid board is supported and inclined downwardly in the direction of movement of the belt whereby the dough is rolled, as it passes under the board, into a cylinder having a diameter corresponding to the spacing between the belt and board at the exit end. The cylinder of dough is then deposited at the opposite end of the apparatus to pass between a pair of spaced rollers, thus being rolled into a sheet. A guide roller receives the sheet of dough emerging from between the forming rollers and guides it toward a plurality of cutter disks. The dough is severed into side-by-side strips as it passes between the guide roller and cutter disks and is deposited on the same conveyor belt used in the initial rolling operation for transport to a final receiving station or pan.

9 Claims, 9 Drawing Figures

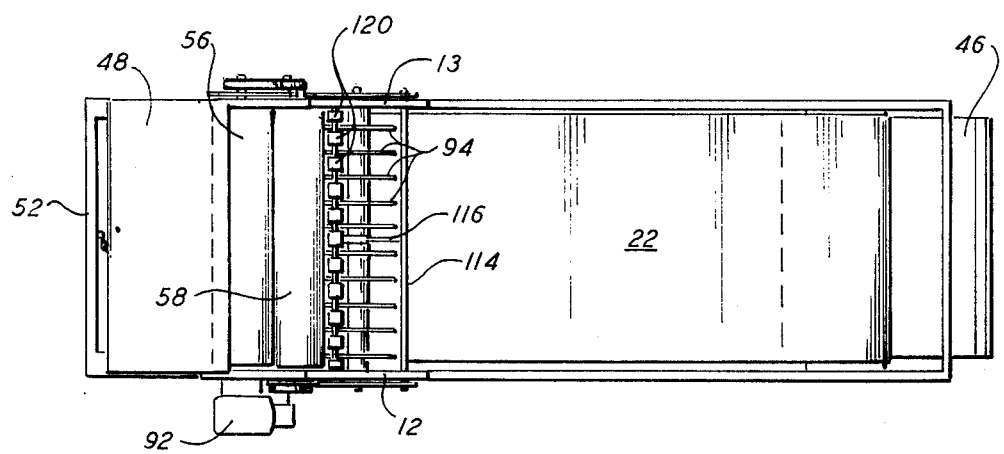
FIG. 3
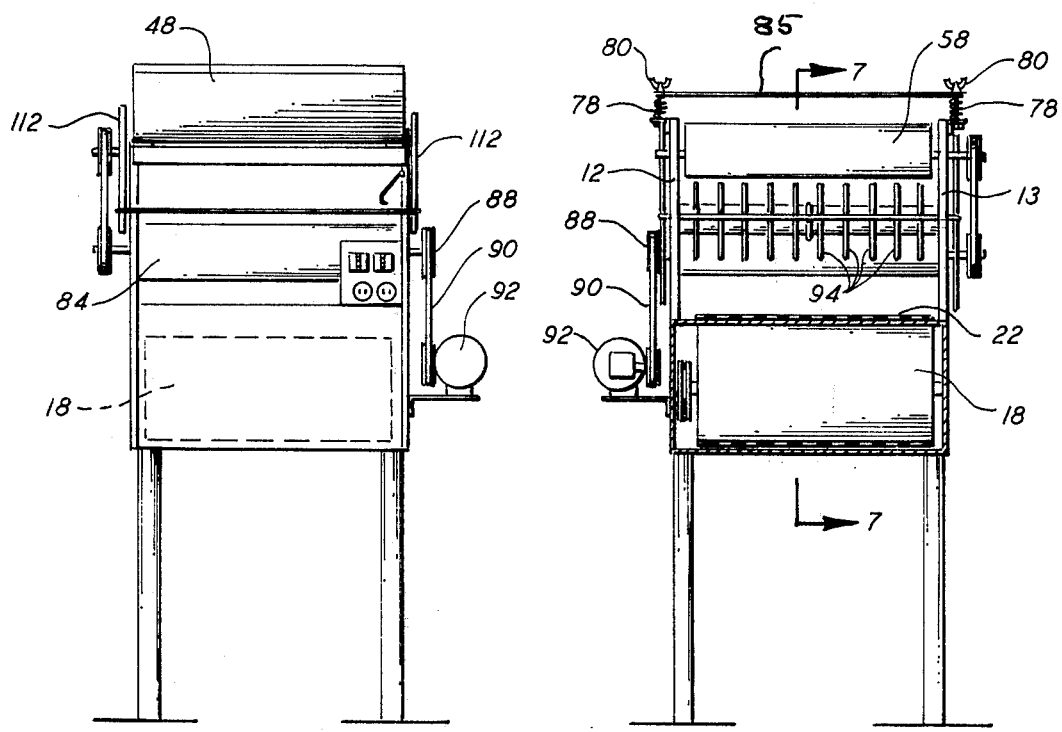
FIG. 4
FIG. 5

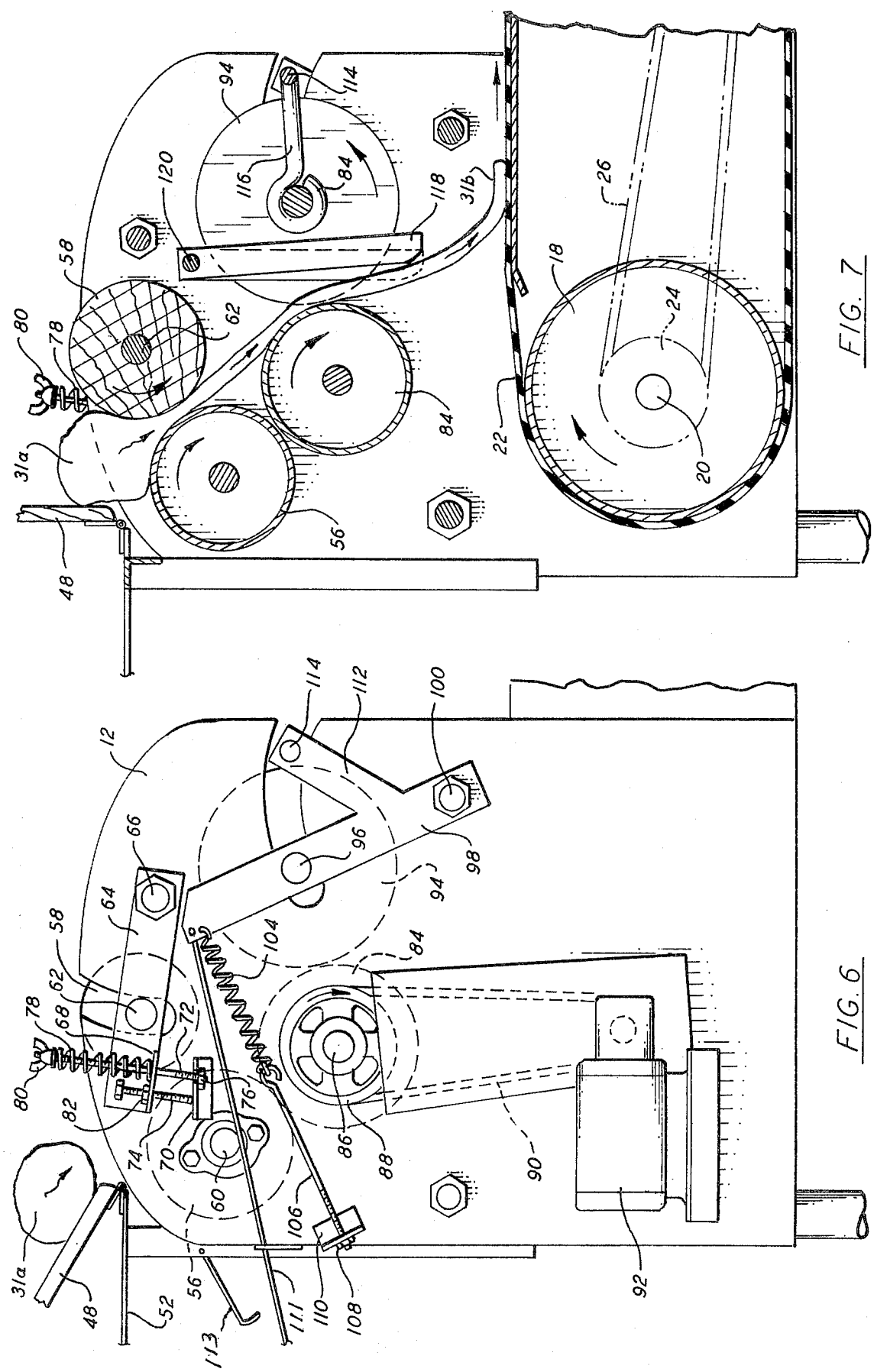

DOUGH FORMING AND CUTTING MACHINE

BACKGROUND OF THE INVENTION

The present invention relates to rolling and shaping dough prior to baking, or otherwise cooking, and more particularly to apparatus for processing a pre-mixed quantity of dough into a plurality of flat strips.

Automatic dough rollers and shapers have been provided in the past for pressing or extruding dough into sheets, loaves, or other forms. In general, however, such apparatus has been suitable for only a single type of operation, such as rolling or cutting, or a plurality of operations are performed by sequentially placed apparatus. That is, common elements of a single machine have not been employed to advantage in performing multi-step processing and forming of dough.

It is a principal object of the present invention to provide a unitary machine, simple and economical in construction, capable of performing a plurality of shaping and cutting operations on comestible dough.

Another object is to provide a dough forming and cutting machine which readily accommodates dough of varying lateral thickness without malfunction.

Still another object is to provide dough forming and transporting apparatus for performing a plurality of operations with a minimal number of power driven elements.

Other objects will in part be obvious and will in part appear hereinafter.

SUMMARY OF THE INVENTION

In accordance with the foregoing objects the apparatus of the invention includes a single, motor driven conveyor belt, which moves the dough through an initial shaping operation, and receives the strips of dough, rolled and cut to their final shape, for transport to a final receiving bin. A stationary board is cooperatively positioned with respect to the conveyor to aid in the first operation. The dough is then manually deposited at the opposite end of the machine for entry between a pair of rollers, one of which is motor driven. The rollers press the dough into a sheet of predetermined thickness and the leading edge is deposited on a guide roll.

A plurality of cutter disks are arranged side-by-side on a common shaft in peripheral engagement with the aforementioned guide roll. As the sheet of dough travels between the guide roll and cutter disks, the latter pass through the dough, severing it into strips. The strips are deposited directly upon the first-mentioned conveyor belt as they emerge from the cutter disks, and are transported to a final receiving bin or pan.

The support structure for the cutter disk shaft provides complete cutting action even though the entering sheet of dough may be uneven in thickness. Other elements of the apparatus are spring biased to improve operation and safety.

BRIEF DESCRIPTION OF THE DRAWINGS

FIG. 3 is a top plan view;

FIG. 4 is a front view;

FIG. 5 is an end elevational view;

FIG. 6 is a enlarged side view of the upper left hand side of the machine;

FIG. 7 is a side sectional view taken on line 7—7 of FIG. 5 showing the dough in a second processing step;

DETAILED DESCRIPTION

Figure 1:
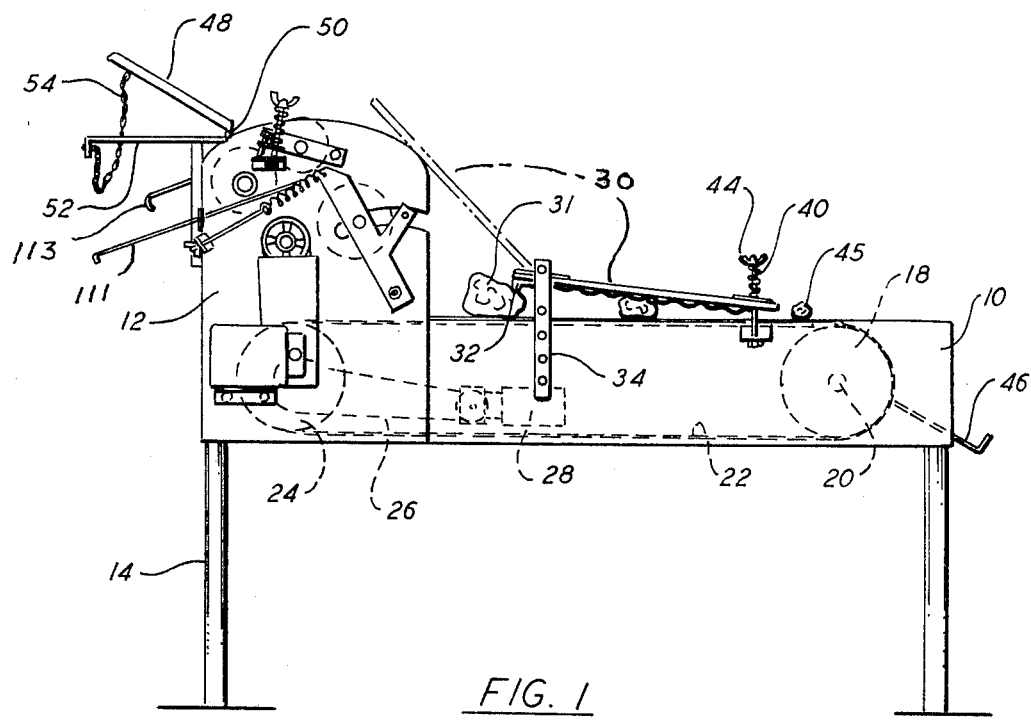
FIG. 1 is a side elevational view of a preferred embodiment of the invention showing dough going through a first processing step.

The movable elements of the apparatus are carried by a pair of support plates on each side. Plates 10 and 12 are seen in FIG. 1, arbitrarily designated the right side of the machine, and plates 11 and 13 in FIG. 2 on the left side. Legs 14 support the apparatus at a convenient height and horizontal rods 16 extend rigidly between opposing side plates.

Drums 18 are mounted for rotation about axles 20, supported by the side plates. Endless belt 22 encircles the drums and serves as the conveyor means of the apparatus. Pulley 24 is concentrically mounted with one of drums 18 for rotation therewith. Belt 26 passes around the output shaft of electric motor 28 for transmitting rotation to pulley 24, and thence to the associated drum 18 and conveyor belt 22.

Board 30 is removably mounted upon side plates 10 and 11 in stationary, spaced relation to conveyor belt 22. The direction of travel of the upper surface of the conveyor belt, from left to right as seen in FIG. 1, establishes entrance and exit ends of board 30 for dough transported on the conveyor belt. In the initial processing step, a suitable quantity of dough in a single, unformed mass, such as that indicated in FIGS. 1 and 8 by reference numeral 31, is placed on belt 22 adjacent the entrance end of board 30, as shown in FIG. 1. As the dough travels from left to right upon belt 22, the upper side of the mass contacts lip 32, extending downwardly along the entrance end of board 30. The upper side of the dough is thus temporarily held stationary as the lower side continues to travel with belt 22, thereby establishing a rolling action. The underside of board 30 is preferably formed with laterally extending ridges or corrugations to aid in the rolling and kneading action as the dough passes under board 30.

Figure 8:
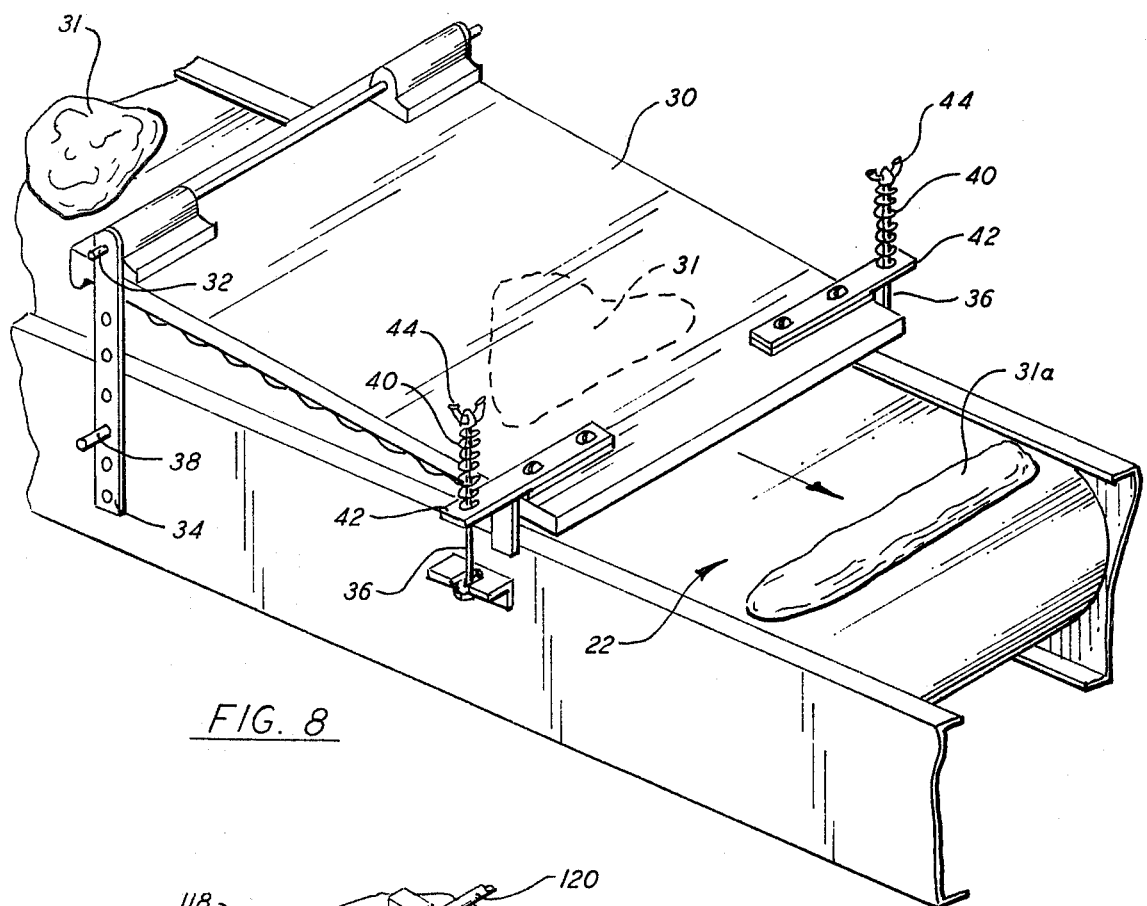
FIG. 8 is a fragmentary, perspective view of portions of the apparatus showing the first processing step in more detail.

As is evident from FIGS. 1 and 8, board 30 is inclined with respect to belt 22. The entrance end is supported by bars 34 at a first distance from the upper surface of belt 22, and the exit end is supported by rods 36 at a second, closer distance from the belt. The first distance is selectively adjustable by providing a plurality of mounting holes in bars 34 through which bolts or pins 38 (FIG. 8) extend into side plates 10 and 11. The exit end of board 30 is biased by springs 40, encircling rods 36 and urging brackets 42 against fixed stops 41, to a position spaced a desired distance from belt 22 to provide a cylindrical roll of dough having a diameter substantially equal to the spacing between the exit end of board 30 and belt 22. The bias of springs 40 is adjustable by the position of wing nuts 44 on the threaded upper ends of rods 36, and allows limited movement of the exit end of the board away from the belt as, for example, when a larger mass of dough than intended is placed upon belt 22 or when the mass of dough is of widely varying thickness, in which case it may be passed under board 30 two or more times.

Figure 2:
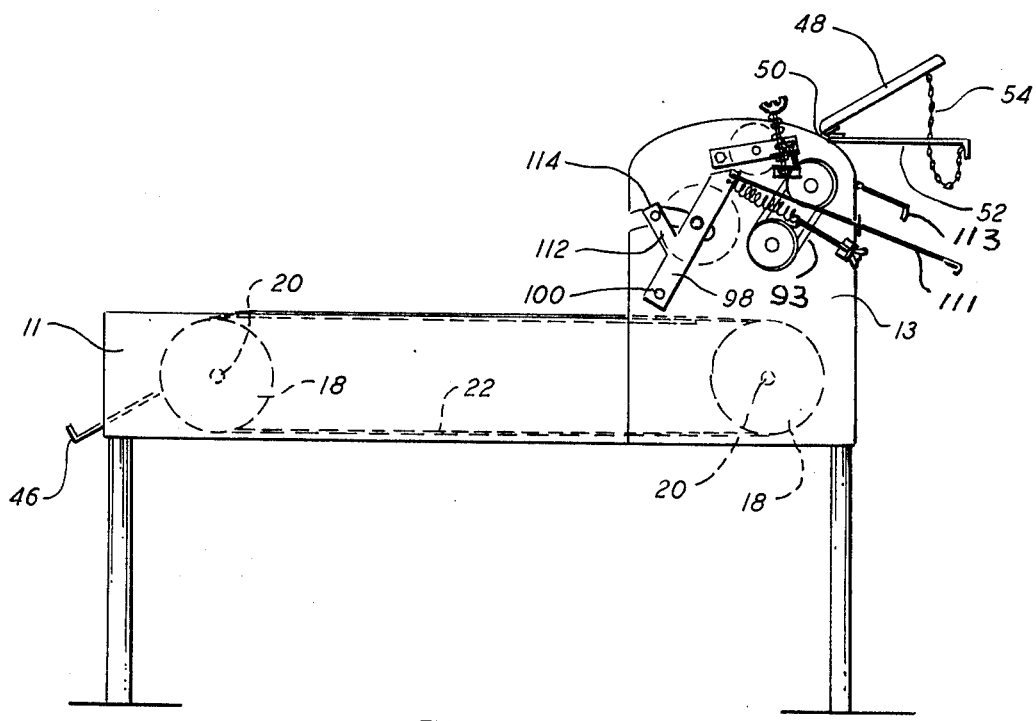
FIG. 2 is an elevational view of the side opposite that shown in FIG. 1 with portions removed.

The cylindrical rolls of dough passing under the exit end of board 30, indicated in FIGS. 1 and 8 by reference numeral 31a, are transported by conveyor belt 22 to a receiving device or bin 46 (FIGS. 1-3). A single roll of dough is removed from bin 46 and placed on board 48, mounted between side plates 12 and 13 for pivotal movement about hinge 50. Fixed support 52 and chain 54 limit movement of board 48 in either direction. The dough is placed on board 48 when it is in the generally horizontal position defined by support 52, and lifted to cause the dough to roll off the board, into the rolling and cutting section of the apparatus.

As seen more clearly in the enlarged views of FIGS. 6 and 7, the dough is fed from board 48 into the gap between periphery spaced rollers 56 and 58, rotatably mounted on shafts 60 and 62, respectively. Roller 56 is power driven, as explained later, and roller 58 acts as an idler roll as dough passes between the two, being rolled into a sheet having a thickness substantially equal to the spacing between the rollers. This spacing is both adjustable and resiliently biased. Shaft 60 is fixedly mounted at each end upon side plates 12 and 13, while shaft 62 is mounted at each end on arms 64 which are attached to the side plates for pivotal movement about bolts 66. Brackets 68 extends outwardly from arms 64, and brackets 70 are affixed to and extend outwardly from side plates 12 and 13. Bolt 72 extends loosely through an opening in bracket 68 and through an open ended slot in bracket 70. Bolt 74 is threaded through an opening in bracket 68. Bolt 72 is retained at the lower end by head 76 and spring 78 is compressed between wing nut 80 and bracket 68, thus biasing arm 64 toward movement in a counter-clockwise-direction, as seen in FIG. 6, about bolt 66. The extent of such movement is limited by contact of the lower end of bolt 74 with fixed bracket 70. The position of bolt 74, which establishes the gap between rollers 56 and 58, may be fixed by advancing lock nut 82 against bracket 68.

Means are also provided for quick release of the pressure between rollers 56 and 58 as a safety feature. Such means are illustrated in FIG. 5 and include a flexible member 85 extending across the top of the machine, attached at each end to the upper ends of bolts 72, under wing nuts 80. Downward pressure on member 85 causes both of bolts 72 to pivot about the points where they pass through brackets 68, moving the upper ends inwardly and the lower ends outwardly, thereby moving heads 76 of the bolts out of engagement with brackets 70 and allowing free pivotal movement of arms 64 about bolts 66 in a clockwise direction as seen in FIG. 6. Thus, roller 58 may move a greater distance away from roller 56 to avoid damage or injury to anything inadvertently placed between the rollers.

Upon exiting from between rollers 58 and 60, the sheet of dough is deposited on the surface of guide roller 84, mounted for rotation on shaft 86. Pulley 88 is also mounted on shaft 86 and belt 90 transmits rotation from electric motor 92 to the pulley and thus to roller 84 in a clockwise direction as seen in FIGS. 6 and 7. As shown in FIG. 2, belt 93 passes around pulleys on the ends of shafts 86 and 60 on the left side of the machine to provide the aforementioned power drive to roller 56. The outer periphery of roller 84 is contacted by each of a plurality of blunt-edged cutter disks 94, mounted in spaced relation on a common shaft 96. Arms 98 are mounted for rotation about bolts 100 on the outside of each side plates 12 and 13. Shaft 96 is carried by arms 98 and may travel in arcuate slots 102 in the side plates when arms 98 move about their pivotal mounting.

The edges of cutter disks 94 are resiliently biased into contact with the periphery of roller 84 by springs 104 which are attached to each of arms 98 and to bolts 106. The tension of springs 104 may be adjusted by moving nuts 108 on the threaded ends of bolts 106 which pass loosely through openings in brackets 110, affixed to each of side plates 12 and 13. Rods 111 arre attached at each side of the machine to arms 98 and extend rearwardly therefrom. Pushing rods 111 forwardly rotates arm 98 against the bias of springs 104 to move disks 94 away from roller 84 in the event a single, unsevered sheet of dough is desired. Hooks 113 provide means for securing rods 111 in the forward position.

Angularly disposed extensions 112 of arms 98 support shaft 114 spaced from the edges of cutter disks 94. Rigidity is provided to shaft 96 by one or more connecting rods 116 which extend from shaft 114 to encircle shaft 96 at the center and/or additional points along its length. This reduces any tendency of shaft 96 to become skewed due to dough of uneven thickness from side to side passing between roller 84 and cutter disks 94 and adds greatly to reliable operation of the apparatus.

Figure 9:
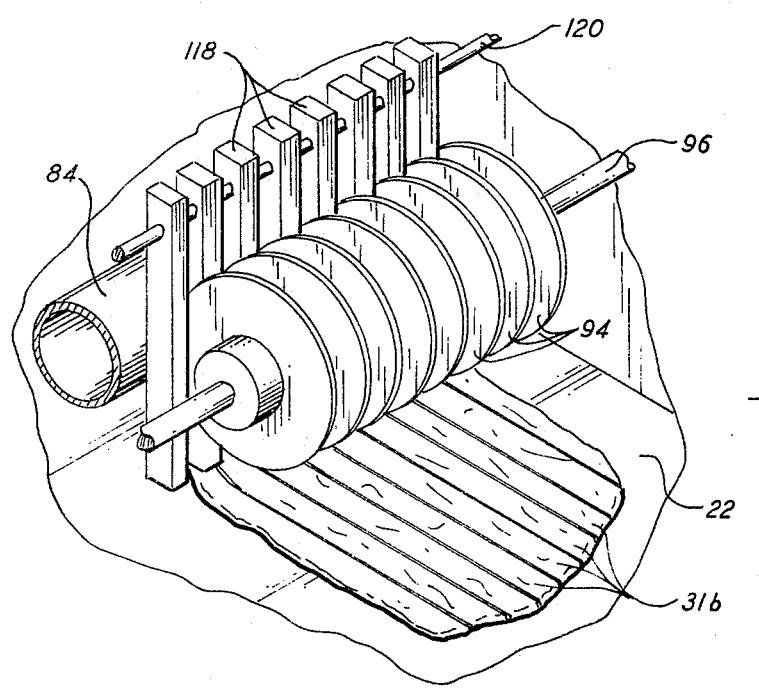
FIG. 9 is a fragmentary, perspective view of other portions of the apparatus showing the final processing step.

Wooden blocks 118 are pivoted loosely upon shaft 120, mounted in side plates 12 and 13 and extend between each of the adjacent cutter disks 94. Blocks 118 are slightly narrower than the space between disks 94 and extend below the lower edges of the disks, as seen in FIGS. 7 and 9. As the sheet of dough passes over roller 84 it is severed into strips by cutter disks 94. Since most types of dough have a relatively tough film on the outside, the severing operation is actually accomplished by the blunt edges of the disk pushing the film through the thickness of the sheet of dough and pinching off the strips thus formed against the periphery of roller 84.

The strips of dough, designated in FIGS. 7 and 9 by reference numeral 31b, are guided downwardly to the surface of conveyor belt 22 by blocks 118. Also, dough is prevented from sticking to the cutter disks by the presence of the blocks between each adjacent pair of disks. The strips of dough, which are now ready for cooking or combination with other ingredients, are transported to receiving device 46 which may conveniently hold a baking pan, or the like. During the second operation, when board 30 is not in use, rods 36 may be removed from engagement with the brackets on side plates 10 and 12, and the board pivoted about pins 32 to the position shown in dot-dash lines in FIG. 1.

I claim:

1. Apparatus for shaping and severing dough, and the like, comprising:
   a. frame means;
   b. a pair of rollers mounted for rotation about parallel axes and having peripheral surfaces spaced by a predetermined distance;
   c. a plurality of cutter disks of uniform diameter and mounted in spaced relation for rotation upon a common shaft;
   d. guide means intermediate said pair of rollers and said cutter discs constructed and arranged to direct a sheet of dough emerging from between said rollers into engagement with said disks to be severed thereby into a plurality of side-by-side strips;
   e. a pair of rigid arms mounted on opposite sides of said frame means and supporting said shaft therebetween;

f. a rigid bar supported at opposite ends upon portions of said arms parallel to and spaced from said shaft by a distance greater than the radius of said disks;

g. a rigid support member connected to said shaft and said bar to extend therebetween substantially perpendicular thereto, at a position intermediate of said arms;

h. said arms being pivotally mounted upon pivot means provided on said frame means for rotation about a common axis parallel to and displaced from both said shaft and said bar.

2. The invention according to claim 1 wherein said guide means comprises a third roller, positioned generally below said pair of rollers for receiving on its upper periphery a sheet of dough emerging from between said pair of rollers.

3. The invention according to claim 2 and further including means biasing each of said arms toward rotation about their respective pivotal mountings in a direction urging the peripheries of said cutter disks into engagement with said third roller.

4. The invention according to claim 3 wherein said position intermediate of said arms is substantially midway therebetween.

5. The invention according to claim 1 and further including an endless conveyor belt having an upper surface movable from a first toward a second end about horizontal axes supported by said frame means; and said disks and said belt being so arranged that said strips are deposited upon said belt adjacent said first end upon emerging from said disks.

6. The invention according to claim 5 and further including a rigid member having an essentially planar surface fixedly positioned above said belt intermediate of said ends and inclined toward said upper surface in the direction of said second end.

7. The invention according to claim 6 wherein the distance between said belt and the nearest portion of said rigid member is greater than said predetermined distance between said pair of rollers.

8. The invention according to claim 7 wherein said rigid member is in the form of a board of substantially the same width as said belt.

9. The invention according to claim 8 and further including mounting means for at least one of said rollers providing selective lateral movement of the axis thereof to increase said predetermined distance.

* * * * *